United States Patent [19]

Grube et al.

[11] Patent Number: 5,201,067
[45] Date of Patent: Apr. 6, 1993

[54] PERSONAL COMMUNICATIONS DEVICE HAVING REMOTE CONTROL CAPABILITY

[75] Inventors: Gary W. Grube, Palatine; Steven G. Parmelee, Crystal Lake, both of Ill.

[73] Assignee: Motorola, Inc., Schaumburg, Ill.

[21] Appl. No.: 693,478

[22] Filed: Apr. 30, 1991

[51] Int. Cl.⁵ .............................. H04B 1/38
[52] U.S. Cl. ....................... 455/89; 455/151.1
[58] Field of Search ........... 455/89, 90, 151, 352, 455/353, 603, 4, 77; 379/61

[56] References Cited

U.S. PATENT DOCUMENTS

| | | | |
|---|---|---|---|
| 3,990,012 | 11/1976 | Karnes | 455/4 |
| 4,197,498 | 4/1980 | Fukui et al. | 455/77 |
| 4,500,752 | 2/1985 | Lee | 379/61 |
| 4,984,295 | 1/1991 | Engstrom et al. | 455/151 |
| 5,020,144 | 5/1991 | Shirley, Jr. et al. | 455/151 |

Primary Examiner—Curtis Kuntz
Attorney, Agent, or Firm—Steven G. Parmelee

[57] ABSTRACT

A personal communications device (100) includes a wireless transceiver (206, 207, 208) to allow a two-way exchange of user information, and to allow down loading of remote control signalling information. The latter can be transmitted via an appropriate transmitter (210 or 211) to facilitate remote control of a remote controlled device.

20 Claims, 2 Drawing Sheets

PERSONAL COMMUNICATIONS DEVICE HAVING REMOTE CONTROL CAPABILITY

FIELD OF THE INVENTION

This invention relates generally to wireless communications devices, including but not limited to one-way and two-way devices, and remote control signal transmitters.

BACKGROUND OF THE INVENTION

Various wireless communication systems and devices are known, including cellular radio telephones, land mobile two-way radios, CT2 radio telephones, and cordless telephones. In each of the above systems, the user can utilize a portable device that can be carried on his person and interact, through an appropriate infrasturcture, to communicate voice and/or data messages to and from the user. For a variety of reasons, including convenience and necessity, the user's of such devices often maintain these handsets in relatively close proximity to themselves to facilitate their elected use by the user, or to allow the user to respond to a message being directed to the user.

Wireless remote control devices are also well understood in the art. For example, remote control signals transmitted via radio frequency carriers are utilized to control such things as garage door openers. Other devices, such as video cassette recorders, television sets, stereo systems, and the like provide for remote control via remote control signals transmitted through use of a light signal, such as an infrared carrier. Typically, each remote controlled device has an associated remote control transmitter. With only a few exceptions, most remote control transmitters are only capable of appropriately controlling a single associated model of remote controlled device. This results for a variety of reasons, not the least of which is a lack of governmental or industry standards regarding such remote control signals. Consequently, many modern homes having numerous remote controlled devices are also burdened with a like plurality of remote control transmitters.

Numerous problems arise due to these numerous remote control devices, including confusion on the part of the user as to which device controls which remote controlled device, and how a particular remote control device operates. With respect to the latter, a user must typically learn a variety of different keyboards in order to facilitate convenient use of a plurality of different remote control devices. Another problem associated with the use of such remote control devices involves assuring ready access to the remote control transmitter when needed.

One prior art solution to the problem of numerous remote control devices has been to provide universal remote control devices that can be placed in a programming mode to learn the remote control signals that relate to a particular remote controlled product, and to thereafter use those signals when placed in an appropriate mode for controlling that particular device. Though this solution does address many of the above mentioned concerns, this particular solution gives rise to other problems. For example, the programming task itself constitutes a rather tedious procedure, whereby typically the user must demonstrate each instruction for the universal remote controller in order for the universal remote controller to learn the signal. This procedure renders the universal remote controller as unacceptable for use by many individuals.

Accordingly, a need exists for a mechanism that will provide for convenient and accurate remote control of existing remote control devices, which solution should not entail complicated procedures to ensure proper programming.

SUMMARY OF THE INVENTION

These needs and others are substantially addressed through provision of the personal communicating device having remote control capability disclosed herein. Pursuant to this invention, the personal communicating device includes an input for receiving user entered instructions, a wireless transceiver that is operably coupled to the input and that is responsive thereto for tranceiving at least the user information, and a wireless transmitter that is also operably coupled to the input and responsive thereto for transmitting remote control signals.

In one embodiment of the invention, the wireless transceiver transmits and receives a radio frequency carrier signal having user information modulated thereon. The wireless transmitter transmits remote control signals on an infrared carrier signal. Typically, the wireless transceiver transmits user information within an effective service area which service area includes but is larger than the effective service for the remote control wireless transmitter.

In one embodiment of the invention, one or more additional wireless transmitters can be included, to accommodate transmission of remote control signals on alternative carrier mediums, to thereby accommodate a wider variety of remote controlled devices.

DESCRIPTION OF A PREFERRED EMBODIMENT

Figure 1:
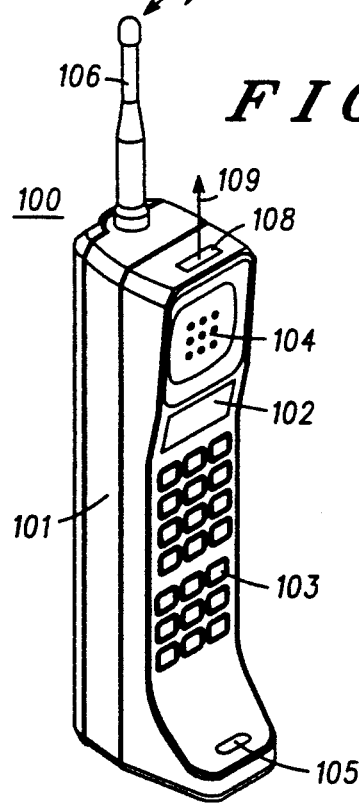
FIG. 1 comprises a perspective view of an illustrative diagrammatic representation of a personal communications device in accordance with the invention.

A personal communications device configured in accordance with the invention can be seen generally as depicted in FIG. 1 and as denoted by reference numeral 100. The personal communications device (100) includes an appropriate housing (101) (comprised of an appropriate material, such as plastic) and having a display (102) and an appropriate input mechanism (103). The display (102) may be, for example, a multiline LCD display. Such a display allows a useful quantity of information to be simultaneously displayed, while requiring only little power. The input device (103) may be, for example, an appropriate keypad, all of the above being well understood in the art.

The personal communications device (100) also includes speaker ports (104) and microphone ports (105) to acoustically accommodate a speaker and microphone as disclosed below in more detail. Preferably, the above noted ports (104 and 105) are suitably located to accommodate the typical distance between the mouth and ear of an average user.

The personal communications device (100) also includes at least one radio frequency emitting structure (106) and a light emitting structure (108). In this particular embodiment, an antenna (which may be either fixed position or extendible/retractable) functions as the RF radiating element, and functions to transmit and receive RF carrier signals (107). The light emitting device (108) in this embodiment functions to transmit an infrared carrier (109) typical of those used by many remote controlled devices.

So configured, and as will become more clear below, this personal communications device (100) can be utilized to facilitate a variety of two-way communications, including both voice and data communications, and to also source one-way remote control signalling.

Figure 2:
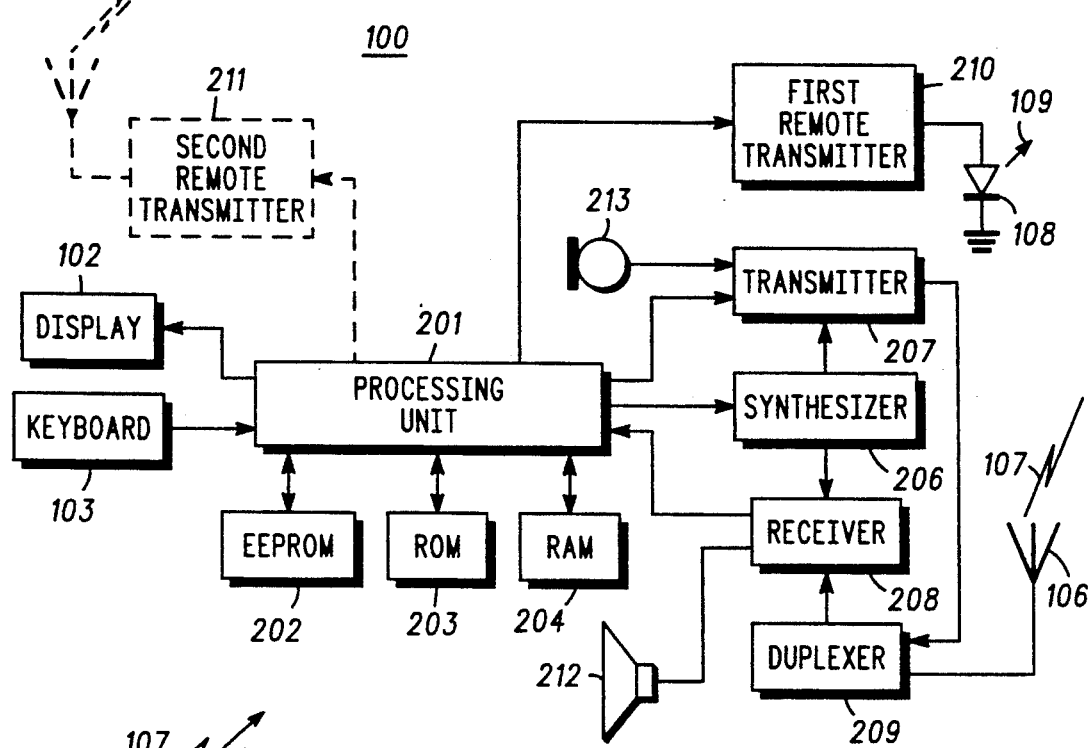
FIG. 2 comprises a block diagram depicting a personal communications device in accordance with the invention.

A more detailed explanation of the personal communications device (100) will now be provided with reference to FIG. 2. The personal communications device (100) includes an appropriate processing unit (201), such as, for example, a 6805, HC11, or 68000 family microprocessor device, all as manufactured and sold by Motorola, Inc. Such a processing unit (201) constitutes a programmable platform that may be programmed in accordance with the requirements set forth below to operate advantageously in accordance with the invention. The processing unit (201) couples to a plurality of memory devices, including an EEPROM (202), a ROM (203), and a RAM (204). Typically, the non-volatile ROM (203) would store the operating program and utilities ordinarily accessed during use by the processing unit (201). The volatile contents of the RAM (204) would be utilized during operation of the personal communications device (100) for retention of session data. The EEPROM (202) would be utilized to retain dynamically changing data having an expected useful lifetime longer than a given single operating session (for example, remote control data as described below in more detail).

The processing unit (201) couples to the previously mentioned display (102) and keyboard (103), to effectuate display of appropriate information and to receive user entered input. The processing unit (201) also connects to a wireless transceiver and a wireless transmitter.

The wireless transceiver, in this embodiment, constitutes a cellular telephone operating in the 800 MHz band. This wireless transceiver includes a transmitter (207) and a receiver (208) for transmitting and receiving appropriately modulated carrier signals, and a synthesizer (206) controlled by the processing unit (201) for providing an appropriate carrier frequency for use by the transmitter and receiver (207 and 208). Both the transmitter and receiver (207 and 208) couple to a duplexer (209), which itself connects to the radiating element (106) described above. The transmitter (207) couples to a microphone (213) to receive audio information from a user to thereby support transmission of that audio information, and the transmitter (207) also couples to the processing unit (201) to allow transmission of data sourced by the processing unit (201). Similarly, the receiver (208) couples to a speaker (212) to allow received audio information to be rendered audible, and also to the processing unit (201) to allow received data to be decoded and appropriately responded to or acted upon by the processing unit (201).

Such wireless transceivers are well understood in the art, and hence a more detailed description need not be presented here. It should be noted, however, that a variety of other wireless platforms could be utilized in this context, including trunked or conventional land mobile radios (particularly those supporting telephone interconnect), cordless telephones, and various telepoint services radios such as (CT2).

The wireless transmitter referred to above comprises, in this embodiment, a first remote transmitter (210) that couples to receive data from the processing unit (201) and that utilizes such information to modulate an infrared radiating source (108), the latter being well understood in the art. So configured, infrared remote control signalling can be appropriately sourced by the personal communications device (100).

If desired, one or more additional remote transmitters (211) can be provided. For example, an additional RF transmitter can be provided to transmit remote control signals on a desired RF carrier, to thereby accommodate such devices as garage door openers and the like. Again, the additional remote control transmitters are coupled to the processing unit (201) to allow the remote control signalling to be sourced thereby.

So configured, the personal communications device (100) can be utilized to source and/or receive two-way telephonic communications, the latter in accordance with well understood prior art technique. The personal communications device (100) can also be used to interface telephonically with a remote site data base containing pertinent information regarding remote control instructions for a particular product or device. Through such interfacing, the personal communications device (100) can receive and store pertinent remote control information, and subsequently utilize that information to provide appropriate remote control signals as desired by the user.

Figure 3:
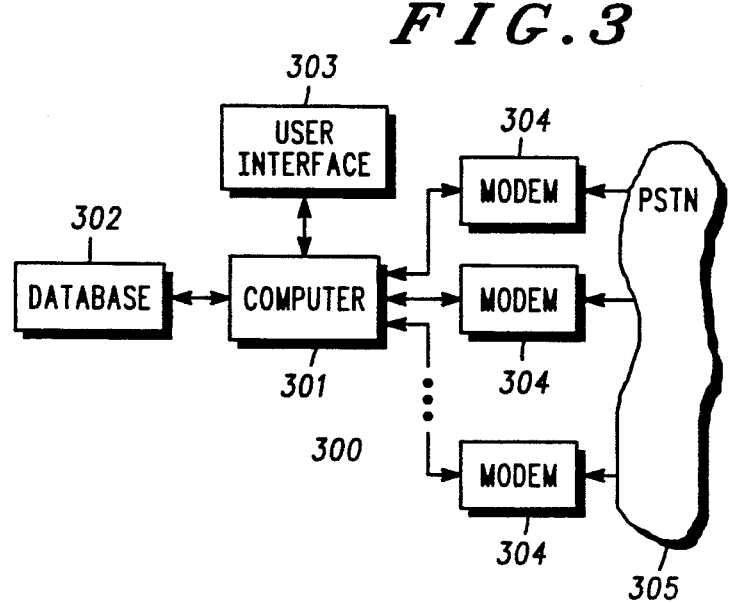
FIG. 3 comprises a block diagram depiction of a remote site data base in accordance with the invention.

With reference to FIG. 3, such a remote site data base (300) would typically include an appropriate computing platform (301) that has an appropriate interface to a data base (302). The data base (302) contains pertinent information regarding remote control signalling for one or more products or devices. Such information could include, but is not limited to, carrier frequency, signalling protocol, modulation type, operational codes, operational code aliases, and so forth. The computer (301) could also couple to an appropriate user interface (303) to allow a remote site custodian to interact with the computer (301) and thereby update the data base (302) or attend to other custodial activities.

The computer (301) couples through one or more dial-up modems (304) to the public switched telephone network (305). The public switched telephone network (305) can of course be accessed in a variety of ways, including through cordless base stations, cellular base stations, telephone interconnect capable repeaters in a dispatch land mobile radio system, telepoint base stations, and so forth. Therefore, so configured, the personal communications device (100) can access the computer (301) and its associated data base (302) via the public switched telephone network (305), all in accordance with well understood prior art technique.

Figure 4:
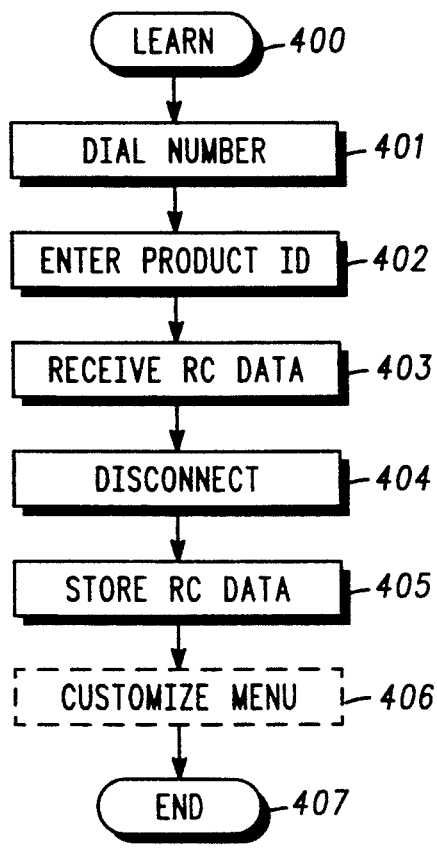
FIG. 4 comprises a flow representation of a learn mode in accordance with the invention.

Referring now to FIG. 4, a learn mode (400) for the personal communications device (100) will be described.

In order to acquire relevant information regarding remote control signalling for a particular product or device, the user dials an appropriate telephone number, which telephone number is associated with the dial-up modem (304) of the appropriate remote site data base (300). This number can be obtained in a variety of ways. For example, the operators manual for a particular product can disclose the number. Also, the number can be displayed either on the product or can be occasionally temporarily displayed on, for example, an integral display screen. By dialing this telephone number, the personal communications device (100) is placed in direct contact with the remote site data base (300). Following whatever appropriate handshake mechanism may be employed, the user then enters an appropriate product ID, such as a model number of the product for which remote control signalling information is sought (402). (This step is appropriate when the remote site data base (300) retains information for a variety of models. If the remote site data base (300) retains information for only one model, or if all models for which information is retained utilize the same set of signalling information, then of course this step could be deleted.)

The personal communications device (100) then receives via the wireless transceiver the remote control information (403) from the remote site data base (300). The personal communications device then disconnects (404) the two-way link and appropriately processes and stores the remote control information (405). Processing may include automatic structuring of the information in accordance with predetermined user aliases (for example, "increase volume" signalling information may be stored in conjunction with the user alias "louder"). In addition, or in the alternative, the user may be provided with the opportunity to then customize an operating menu (406). In such a mode, the manufacturer's alias can be presented on the display, and the user could alter that alias to reflect personal preference. Then, following the above, the process concludes (407).

Remote control signalling information for a particular product or device has now been obtained and customized for presentation as appropriate. If desired, and depending upon the quantity of memory provided, a large number of remote control signalling information sets can be similarly obtained and retained within the personal communications device (100), thereby providing the personal communications device (100) with a broad based capability to control a variety of different devices.

Figure 5:
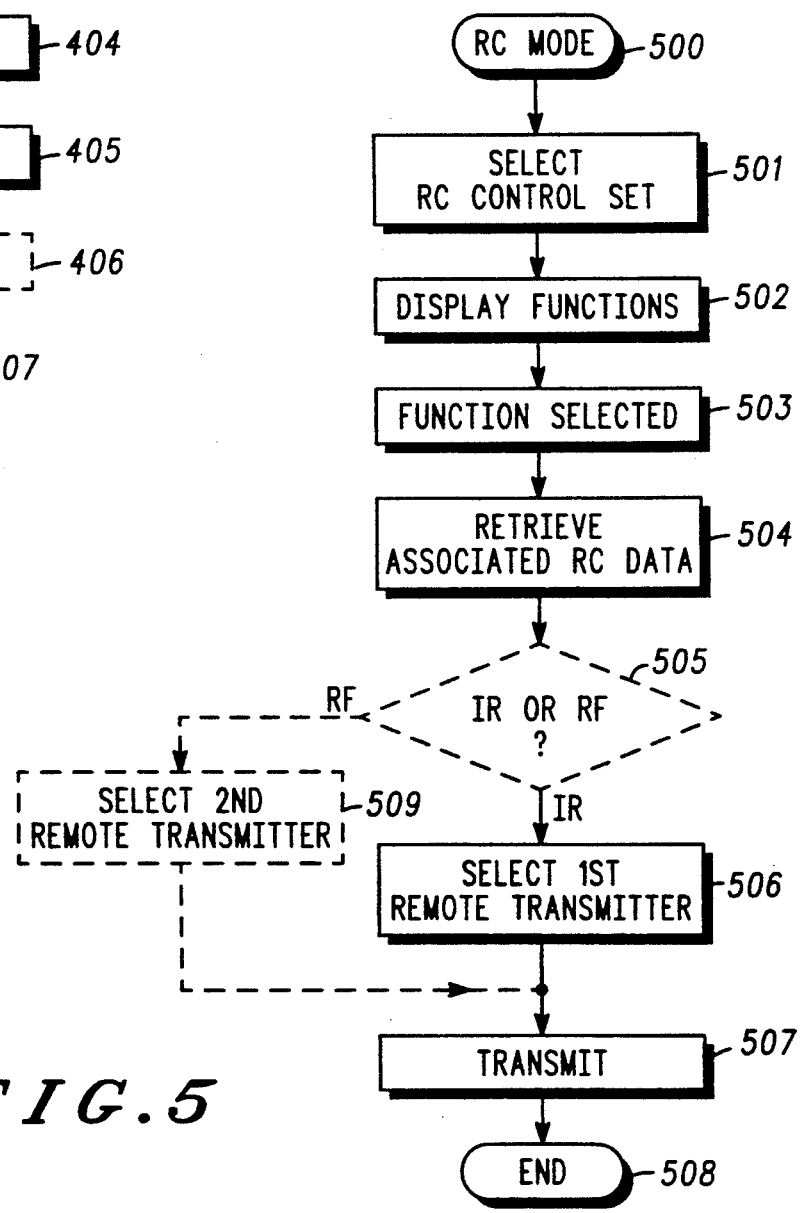
FIG. 5 comprises a flow diagram of a remote control mode in accordance with the invention.

Referring now to FIG. 5, use of the personal communications device (100) in a remote control mode (500) will be described.

To begin, the user selects a particular remote control information set (501). For example, if a user has programmed the personal communications device (100) as described above to retain remote control information for his or her first and second televisions, a video cassette recorder, a stereo system, and a garage door opener, a selection menu can be provided on the display (102) from which the user can select a particular device to be controlled. Upon selecting an appropriate remote control data set, the personal communications device retrieves the corresponding information and displays available functions to the user (502). Again, as noted earlier, this display can make use of either pre-established or user customized aliases to identify the various remote control features. The user then selects one of the remote control functions (503) and the personal communications device (100) retrieves the associated remote control data (504) and prepares a remote control signal corresponding thereto.

If the personal communications device (100) has more than one remote control wireless transmitter (such as the infrared and radio frequency transmitters depicted in FIG. 2), the personal communications device selects the appropriate transmitter (505) in accordance with the requirement of the remote control signal requested. The personal communications device (100) then readies either the first remote transmitter (506) or the second remote transmitter (509) and transmits the appropriate remote control signalling (507). The process then concludes (508).

So configured, a wide variety of benefits are obtained. The personal communications device (100) is intended for the personal use of a particular user, and hence will tend to be retained physically proximal to the user. It will therefore remain typically conveniently located to the user when remote control capabilities are required, and hence will facilitate remote control activities with a minimum of inconvenience or delay. Further, the device (100) can readily learn remote control data sets for new products with little required of the user beyond merely dialing a telephone number, thereby avoiding the tedious and error prone learning methodologies of the prior art. This device (100) also better serves user ergonomics. In particular, the user will already be well familiar with the keyboard and display functionality of his or her personal communications device, and will not have to relearn alternative layouts for a plurality of remote control transmitters, as currently required by the prior art.

What is claimed is:

1. A personal communicating device, comprising:
A) a housing;
B) input means for receiving user entered instructions;
C) wireless transceiver means at least partially contained within the housing and being operably coupled to the input means and being responsive thereto for transceiving;
  i) at least voice and data user information; and
  ii) remote control information:
D) first wireless transmitter means at least partially contained within the housing and being operably coupled to the input means and being responsive thereto for transmitting remote control signals to a device separate from the personal communicating device, wherein said first wireless transmitter means is at least partially discrete with respect to said wireless transceiver means.

2. The personal communicating device of claim 1, wherein the first wireless transmitter means transmits an infrared carrier signal.

3. The personal communicating device of claim 2, wherein the wireless transceiver means transmits and receives a radio frequency carrier signal.

4. The personal communicating device of claim 1, wherein the first wireless transmitter means transmits remote control information only within a first service area, and the wireless transceiver means transmits user information within a second service area, which second service area is larger than, and includes, the first service area.

5. The personal communicating device of claim 1 wherein the input means includes a keypad.

6. The personal communicating device of claim 1, and further including display means operably coupled to at least the input means for displaying at least information pertaining to the user entered instructions.

7. The personal communicating device of claim 1, and further including control means operably coupled to the input means, the first wireless transmitter means, and the wireless transceiver, for causing the input means to control the first wireless transmitter means when in a first mode of operation and for causing the input means to control the wireless transceiver means when in a second mode of operation.

8. The personal communicating device of claim 1, and further including memory means operably coupled to the first wireless transmitter means for storing at least some of the remote control signals.

9. The personal communicating device of claim 8, wherein:
  A) the wireless transceiver means further functions to receive remote control information; and
  B) the memory means is operably coupled to the wireless transceiver means and further functions to store at least some of the remote control information.

10. The personal communicating device of claim 9, and further including display means operably connected to the memory means for displaying at least some of the remote control information.

11. The personal communicating device of claim 1, and further including second wireless transmitter means operably coupled to the input means and being responsive thereto for transmitting remote control signals.

12. The personal communicating device of claim 11, wherein the first wireless transmitter means transmits an infrared carrier signal and the second wireless transmitter means transmits a radio frequency carrier signal.

13. The personal communicating device of claim 12, and further including memory means operably coupled to the first and second wireless transmitter means for storing at least some of the remote control signals.

14. The personal communicating device of claim 13, wherein:
  A) the wireless transceiver means further functions to receive remote control information; and
  B) the memory means is operably coupled to the wireless transceiver means and further functions to store at least some of the remote control information.

15. The personal communicating device of claim 14, and further including display means operably connected to the memory means for displaying at least some of the remote control information.

16. A personal communicating device, comprising:
  A) a housing;
  B) input means for receiving user enter instructions;
  C) wireless transceiver means at least partially contained within the housing and being operably coupled to the input means and being responsive thereto for transceiving:
    i) at least voice and data user information; and
    ii) remote control information;
  D) memory means operably coupled to the input means and the wireless transceiver means for storing at least some of the remote control information;
  E) first wireless transmitter means at least partially contained within the housing and being operably coupled to the input means and the memory means and being responsive thereto for transmitting remote control signals to a device separate from the personal communicating device, wherein said first wireless transmitter means is at least partially discrete with respect to said wireless transceiver means.

17. The personal communicating device of claim 16, wherein the wireless transceiver means comprises at least one of:
  A) a cordless telephone handset;
  B) a cellular radio telephone;
  C) a CT2 radio telephone handset;
  D) a land mobile two-way radio.

18. The personal communicating device of claim 16, wherein the wireless transceiver means selectively comprises at least two of:
  A) a cordless telephone handset;
  B) a cellular radio telephone;
  C) a CT2 radio telephone handset;
  D) a land mobile two-way radio.

19. The personal communicating device of claim 16, wherein the remote control information includes:
  A) remote control signals; and
  B) alias information relating to at least some of the remote control signals.

20. The personal transceiver of claim 19, and further including display means operably connected to the memory means for displaying at least some of the alias information.

* * * * *